(12) United States Patent
Fukaya et al.

(10) Patent No.: US 7,640,649 B2
(45) Date of Patent: Jan. 5, 2010

(54) METHOD FOR REMOVING A MAGNETIC HEAD SLIDER

(75) Inventors: Hiroshi Fukaya, Shatin (HK); Satoshi Yamaguchi, Shatin (HK)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 408 days.

(21) Appl. No.: 11/199,146

(22) Filed: Aug. 9, 2005

(65) Prior Publication Data

US 2006/0037188 A1 Feb. 23, 2006

(30) Foreign Application Priority Data

Aug. 23, 2004 (JP) .............................. 2004-242273

(51) Int. Cl.
*G11B 5/48* (2006.01)
*B23K 1/018* (2006.01)

(52) U.S. Cl. ................... 29/603.02; 29/603.06; 29/840; 29/843; 228/191; 219/121.66; 360/234.5; 360/245.8

(58) Field of Classification Search ............. 29/603.02, 29/603.04, 603.06, 840, 843, 860, 762; 228/264, 228/191; 360/234.5, 245.8, 245.9; 219/121.66
See application file for complete search history.

(56) References Cited

U.S. PATENT DOCUMENTS

| 4,877,175 | A | * | 10/1989 | Jones et al. ............. 228/264 X |
| 5,530,604 | A | * | 6/1996 | Pattanaik ................. 360/234.5 |
| 5,699,212 | A | * | 12/1997 | Erpelding et al. ..... 360/234.5 X |
| 5,809,634 | A | * | 9/1998 | Inaba ....................... 29/603.04 |
| 6,156,150 | A | * | 12/2000 | Nishida .................... 29/762 X |
| 2002/0029461 | A1 | * | 3/2002 | Kamigama et al. .... 29/603.04 X |

FOREIGN PATENT DOCUMENTS

| JP | 5-166159 | * 7/1993 |
| JP | 2002-150734 | 5/2002 |

OTHER PUBLICATIONS

English language Abstract of 2002-150734.

* cited by examiner

*Primary Examiner*—A. Dexter Tugbang
(74) *Attorney, Agent, or Firm*—Greenblum & Bernstein, P.L.C.

(57) ABSTRACT

A method which enables easy removal of a magnetic head slider soldered to a suspension and easy reuse of the removed parts. In the method for removing the magnetic head slider, heat is applied to a suspension to which at least a part of the magnetic head slider is joined by solder so as to remove the magnetic head slider from the suspension. The heating is locally applied to the junction area of the magnetic head slider and the suspension, which is joined by the solder.

9 Claims, 8 Drawing Sheets

METHOD FOR REMOVING A MAGNETIC HEAD SLIDER

BACKGROUND OF THE INVENTION

1. Field of the Invention

The present invention relates to a method and an apparatus for removing a magnetic head slider and, more specifically, to a method and an apparatus for removing a magnetic head slider from a suspension in a head gimbal assembly which is judged as being a defective product in an assembling process thereof.

2. Description of the Related Art

As high-speed, highly reliable, and low-cost recording devices, hard disk drives (HDD) are widely used for reading/writing digital data. With an HDD, reading/writing of data to/from a magnetic disk is carried out by using a thin film magnetic head. This magnetic head comprises a suspension and a magnetic head slider. This magnetic head slider comprises an electromagnetic conversion element which carries out reading/writing of data. The suspension holds the magnetic head slider through fixing it by adhesive or solder to a gimbal spring part of a flexure which constitutes the suspension.

When manufacturing the magnetic head, an inspection for checking a reading/writing property of the magnetic head can be performed only after the magnetic head slider and the suspension are assembled. Thus, defective products are found after the assembling. The defective rate thereof is extremely higher than the defective rate found in the suspension alone so that a strict inspection is required after the assembling. With this, it eliminates a risk of having the detected defective products remained in shipping products so as to improve the quality.

However, if the above-mentioned defective product as a whole is to be dumped, the suspension is also dumped along therewith even though, for example, there is only reading/writing malfunction generated in the electromagnetic conversion element of the magnetic head slider. Since the suspension is usually more costly than the slider, the cost for manufacturing the magnetic head becomes strikingly increased. On the other hand, in the case where the magnetic head slider can be reutilized even though the suspension is defective, there causes a waste of parts as in the above-described case. Thus, the manufacturing cost is increased.

Therefore, in order to achieve a reduction in the manufacturing cost of the magnetic head, it is desired to carry out an inspection for checking the reading/writing property after assembling the suspension and the slider once, then, if there is a defective product found, the suspension and the magnetic head slider are separated so as to reutilize the fine magnetic head slider or suspension.

For satisfying the demand as described above, Japanese Patent Unexamined Publication No. 2002-150734 discloses a technique for removing a magnetic head slider from a suspension. The technique disclosed in JP-A 2002-150734 is to remove an assembled magnetic head slider, which is joined by an adhesive resin to a flexure that constitutes a suspension, by controlling a cure state of the adhesive resin through temperatures.

In the meantime, in a head gimbal assembly, solder is used for connecting a connection pad of the magnetic head slider and a lead trace formed on the flexure. Also, there may be cases where the magnetic head slider is fixed to the flexure as the suspension by solder. In that case, it is not possible to deal with the solder fixation by using the technique for removing the magnetic head slider, which is disclosed in JP-A 2002-150734. In the case where, as described above, the magnetic head slider is removed form the flexure in the head gimbal assembly in which parts are joined by the solder, it is necessary to melt the solder by applying heat. As described above, conventionally, a method which is to heat the entire magnetic head up to a melting point of the solder has been employed.

However, with the above-described method, the temperature of the entire magnetic head may be increased as high as the melting pint of the solder or more thus damaging the electromagnetic conversion element of the magnetic head slider. That is, there is a risk of breaking the electromagnetic conversion element since the general melting point of the solder is at about 230° C., while the critical temperature of a reading element (MR element) is at about 250° C. When that happens, it cannot be reutilized even though there is no defect in the suspension, which results in wasting the parts. Further, the suspension is also heated entirely so that the rigidity of the suspension may be affected by the heat.

Furthermore, the above-described method simply removes the magnetic head slider by melting the solder. Thus, there may be the solder remained attached to the magnetic head slider or the suspension. In that case, before reutilizing the magnetic head slider or the suspension, it is necessary to carry out processing for removing the attached solder. Therefore, there may cause a problem that manufacturing procedures are increased and the time and cost thereof are increased as well.

SUMMARY OF THE INVENTION

It is therefore an object of the present invention to provide a method and an apparatus for removing a magnetic head slider, which can improve the inconveniences of the above-described conventional case and, more particularly, enables to easily remove and separate a magnetic head slider solder from a suspension and readily reutilizes the separated part.

As one form of the magnetic head slider removing method according to the present invention, there is provided a magnetic head slider removing method for removing a magnetic head slider from a suspension to which at least a part of the magnetic head slider is joined by solder, the method comprising the step of:

locally heating a junction area of the magnetic head slider and the suspension, which is joined by the solder.

In the above-described method, the junction area joined by the solder is locally heated so that there is no need to heat the entire head gimbal assembly in which the magnetic head slider is mounted to the suspension. Thus, it is possible to remove the magnetic head slider by melting the solder while suppressing an excessive heat applied for the magnetic head slider or the suspension. Therefore, the heat applied for melting the solder is effectively adsorbed to the solder, which suppress damages to the magnetic head slider due to the solder melting heat. Further, it suppresses a change in the rigidity of the suspension caused by the heat so that the magnetic head slider and the suspension after being removed from each other can be reutilized easily.

Furthermore, in addition to the above-described method, it is desirable to apply heat to a boundary area between the solder and the suspension. With this, as described above, the solder can be effectively melted in the vicinity of the boundary area between the solder and the suspension while suppressing an excessive heat applied for the magnetic head slider or the suspension. Thus, the solder at the junction area on the magnetic head slider side is not melted thus maintained attached to the slider. Therefore, when the magnetic head slider is removed from the suspension, the solder is eliminated from the suspension along with the magnetic head slider thus suppressing the residual of the solder remained on the suspension. As a result, when reutilizing the suspension, it is unnecessary to additionally perform processing for removing the solder from the suspension. Thereby, the manufacturing cost can be reduced.

It is more desirable to heat the solder using a laser irradiating device. With this, control of the heating area becomes easy and local heating can be accurately performed. Particularly, by surely heating the boundary area between the solder and the suspension, it enables to further reduce the solder remained on the suspension.

In addition to the above-described method, it is desirable to comprise the step of energizing the magnetic head slider in a direction of detaching from the suspension during the heating. Thereby, a force for detaching the magnetic head slider from the suspension is to be applied to the magnetic head slider during the heating. Thus, the magnetic head slider can be removed at the same time as the solder is melted and the heating thereafter can be stopped since it becomes unnecessary. With this, it enables to effectively suppress an excessive heat applied to the magnetic head slider and the suspension. In the case where the magnetic head slider is energized to be detached from the suspension before heating, the suspension may be deformed by the energizing force thus shifting the junction area joined by the solder. However, the heating area to be heated by the heating device can be set for the junction area which is in a still state after being shifted. Thus, heating can be performed accurately.

Further, in addition to the above-described method, it is desirable to set an energizing force for energizing the magnetic head slider away from the suspension within a range by which the suspension can be elastically deformed. With this, the suspension is deformed by the energizing force since, before the solder is melted, the magnetic head slider and the suspension are joined. At this time, the deformation is kept within an extent of elastic deformation so that it is possible to suppress the deterioration in the property such as the rigidity of the suspension.

Furthermore, in addition to the above-described method, it is desirable to comprise the step of holding the suspension for restricting movement of more than a prescribed distance in the detaching direction when energizing the magnetic head slider in the direction of detaching from the suspension. With this, even if the suspension is deformed by the above-described energizing force, deformation of a prescribed amount or more can be suppressed since the suspension is being held down. Therefore, it is possible to achieve a stable removing and to suppress the deterioration in the quality of the suspension to be reutilized.

Moreover, in addition to the above-described method, it is desirable to comprise the step of cooling the magnetic head slider while the heating is applied. With this, the magnetic head slider is cooled while heating the solder. Therefore, it enables to suppress melting of the solder at the junction area on the magnetic head slider side thus melting only the solder at the junction area on the suspension side. Thereby, the solder is remained to be fixed to the magnetic head slider when the magnetic head slider is removed so that the solder to be remained and attached on the suspension can be suppressed. As a result, reutilization of the costly suspension becomes still easier. Further, a temperature increase in the magnetic head slider can be suppressed so that breakdown of the magnetic head slider can be prevented. Thus, it becomes possible to reutilize the magnetic head slider as well.

In addition to the above-described method, it is desirable to perform the energizing in the detaching direction by using a suction device which suctions the magnetic head slider. With this, there is air flown into the suction device from its periphery by performing suction. At this time, the air flown from the periphery of the suction device is sucked by the suction device after making contact with the magnetic head slider. Thus, the magnetic head slider is cooled by the sucked air. Therefore, as in the above-described case, only the solder at the junction area on the suspension side is easily melted. Accordingly, the residual of the solder attached on the suspension can be suppressed further so that reutilization of the suspension becomes still easier. Further, as in the above-described case, breakdown of the magnetic head slider by the heat can be suppressed as well.

Furthermore, when performing suction by the suction device, the suction device may be disposed in such a manner that a part of a suction port is left open. With this, a large amount of air is flown to the suction device side from the open part of the suction port thus increasing the amount of air to be in contact with the magnetic head slider. Therefore, cooling of the magnetic head slider can be promoted by the sucked air. Accordingly, only the solder at the junction area on the suspension side becomes easily melted while the solder at the junction area on the magnetic head slider side is hard to be melted. As a result, the solder is attached to the removed magnetic head slider and residual on the suspension can be more suppressed. Thus, as in the above-described case, breakdown of the magnetic head slider by the heat can be suppressed as well.

Furthermore, in addition to the above-described method, it is desirable to simultaneously perform the heating to all of each junction area when there are a plurality of junction areas of the solder for joining the magnetic head slider and the suspension. With this, the solder at a plurality of junction areas between the magnetic head slider can be almost simultaneously melted, and the slider is removed at the same time as the melting of the solder at all the spots. Therefore, it is possible to suppress an excessive heat to be applied locally.

The present invention also provides a magnetic head slider removing apparatus for carrying out the above-described method. As one form of the magnetic head slider removing apparatus, the apparatus of the present invention comprises a heating device for applying heat to a suspension to which at least a part of a magnetic head slider is joined by solder; and a removing device for removing the magnetic head slider from the suspension by energizing the magnetic head slider in a direction of detaching from the suspension, wherein the heating device locally heats a junction area of the magnetic head slider and the suspension, which is joined by the solder.

In the above-described structure, the heating device heats a boundary between the solder and the suspension. It is desirable to constitute the heating device by a laser irradiating device.

Further, heating is performed by the heating device after energizing the magnetic head slider by the removing device in the direction of detaching from the suspension. Furthermore, it is more desirable to provide a cooling device for cooling the magnetic head slider.

Moreover, it is desirable to constitute the above-described removing device by a suction device which suctions the magnetic head slider in the direction of detaching from the suspension. In addition, it is more desirable to dispose a suction port of the suction device in such a manner that a part of the suction port is left open.

In addition to the above-described structure, it is desirable to have a structure in which a movement restricting device for restricting the suspension to move more than a prescribed distance in the detaching direction.

Further, when there are a plurality of junction areas of the solder for joining the magnetic head slider and the suspension, the heating device is provided in such a manner that the solder in each junction area can all be heated, and a control device for controlling actions of the heating device and the suction device is provided, wherein the control device has a function of controlling to heat the solder at all the spots simultaneously by the heating device.

The magnetic head slider removing apparatus in the above-described structure also achieves the same effect as that of the above-described method. Thus, the magnetic head slider soldered to the suspension can be easily removed and the removed parts can be readily reutilized.

In the present invention, the junction area of the suspension and the magnetic head slider joined by the solder is locally heated so that it is unnecessary to heat the entire head gimbal assembly. Thus, the magnetic head slider can be removed and separated from the suspension by melting the solder. Since an excessive heating of the magnetic head slider or the suspension is suppressed, failure of the magnetic head slider by the heat applied for melting the solder can be suppressed. Further, a change in the rigidity of the suspension, etc. can be suppressed so that reutilization of the magnetic head and the suspension after being removed becomes simple. Moreover, deterioration in the quality of the reuse products can be suppressed, which is an excellent effect that has not been achieved conventionally.

BRIEF DESCRIPTION OF THE DRAWINGS

FIG. 1 is a schematic diagram for showing the structure of a top end part of a head gimbal assembly, in which

FIG. 2 is an illustration for describing the order of a magnetic head slider removing method, in which

FIG. 3 is an illustration for describing the order of a magnetic head slider removing method, in which

FIG. 4 is an illustration for showing a modification example of a heating method using a laser irradiator, in which

FIG. 6 is an illustration fro showing a modification example of the magnetic head slider removing method, in which

FIG. 7 is a schematic diagram for showing the structure of a magnetic head slider removing apparatus, in which

DETAILED DESCRIPTION OF THE PREFERRED EMBODIMENTS

The present invention enables to remove a magnetic head slider from a suspension so that a fine part (either the magnetic head slider or the suspension) can be removed to be reused when there is defect found in an assembly as a result of an inspection performed on a head gimbal assembly in which the magnetic head slider and the suspension are joined by solder. Mainly, the present invention is distinctive in respect that it employs a heating method which aims to melt the solder only and not to apply an excessive heat to the magnetic head slider and the suspension which are to be reutilized. Further, the present invention is also distinctive in respect that there is no remaining solder attached to the suspension. Thus, it is possible to easily reutilize the suspension which is less defective and costly. In the followings, a specific method is described in a first embodiment, and an example of an apparatus which achieves the method is described in a second embodiment. In addition, another method is described in a third embodiment.

First Embodiment

The first embodiment of the present invention will be described by referring to FIG. 1-FIG. 5. FIG. 1 is a schematic diagram of a head gimbal assembly to which the present invention is directed. FIG. 2-FIG. 4 are illustrations for describing a magnetic head slider removing method of the present invention. FIG. 5 is a flowchart for showing an order of the method.

(Head Gimbal Assembly)

Figure 1A:
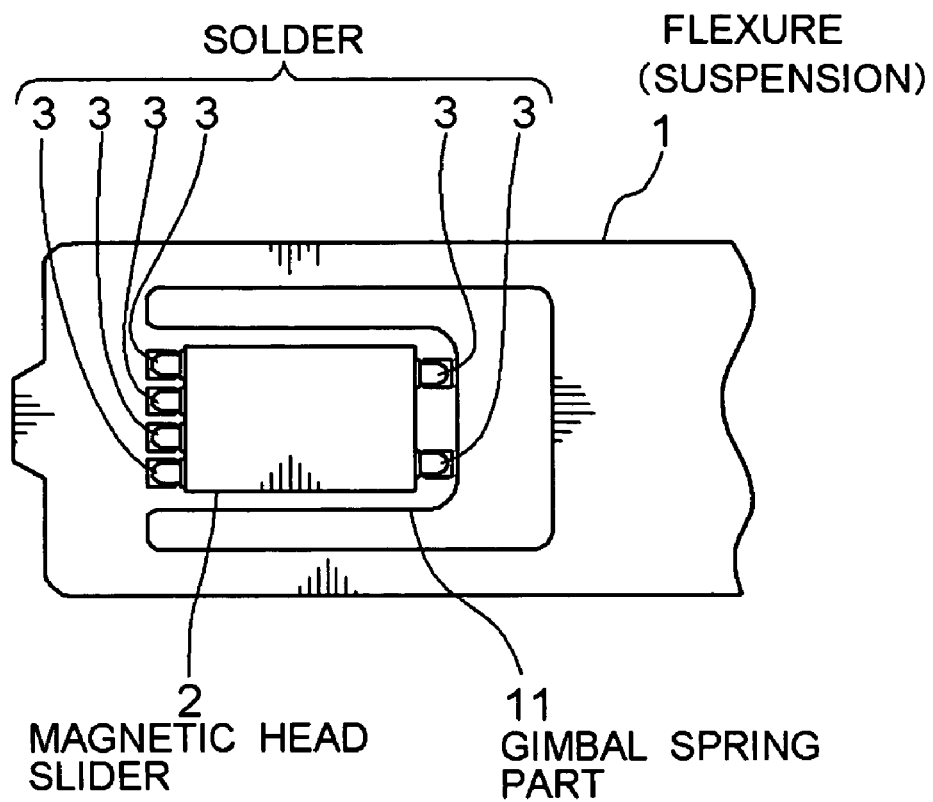
FIG. 1A is a plan view and FIG. 1B is a side view.
Figure 1B:
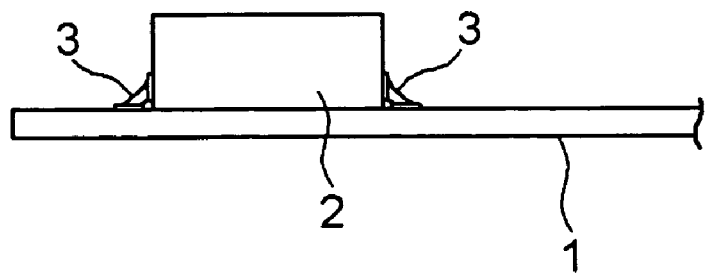

In a head gimbal assembly as a target of the present invention for removing the magnetic head slider, as shown in FIG. 1, a magnetic head slider 2 is joined to a suspension 1 by solder 3. The assembly is judged as a defective product in terms of information reading/writing property as a result of an inspection performed under an assembled state. FIG. 1 shows a simplified structure of the head gimbal assembly, in which FIG. 1A shows an enlarged plan view of the top end part and FIG. 1B shows a side view.

Specifically, in the head gimbal assembly, the magnetic head slider 2 is mounted to a gimbal spring part 11 of the suspension 1 as a flexure. The top end side and a rear end side of the magnetic had slider 2 are joined by the solder 3. Particularly, the solder 3 at four spots on the top end side (on the left side in FIG. 1A) of the magnetic head slider 2 is used for connecting connection pads of a lead trace, not shown, formed on the suspension 1 and connection pads on the magnetic head slider 2. Further, the solder 3 at two spots on the rear end side (on the right side of FIG. 1B) of the magnetic head slider 2 is used for securely fixing the magnetic head slider 2 to the gimbal spring part 11. The solder 3 used in this embodiment is lead-free solder of 230° C., however, it is not limited to the solder with such property.

The head gimbal assembly as the target of the present invention is not limited to the above-described structure. For example, the magnetic head slider 2 may be fixed to the gimbal spring part 11 by an adhesive agent such as epoxy resin. In that case, it is not necessary to join the magnetic head slider 2 to the gimbal spring part 11 by the solder at the rear end side of the magnetic head slider 2 as described above. Thus, there is only the solder 3 used for electrical connection at the four spots on the top end side of the magnetic head slider 2, and only this solder 3 becomes a target of heating as will be described later. In the above-described case where the magnetic head slider 2 is fixed by the adhesive agent, the adhesive agent is eliminated by an organic solvent such as acetone, cyclohexane, etc. before heating the solder 3.

(Magnetic Head Slider Removing Method)

The method of removing the magnetic head slider 2 from the suspension 1 in the head gimbal assembly of the above-described structure will be described by referring to explanatory illustrations of FIG. 2-FIG. 4 and a flowchart of FIG. 5.

As in FIG. 1B, FIG. 2 and FIG. 3 show side views of the top end part of the head gimbal assembly viewed from the side.

Figure 2A:
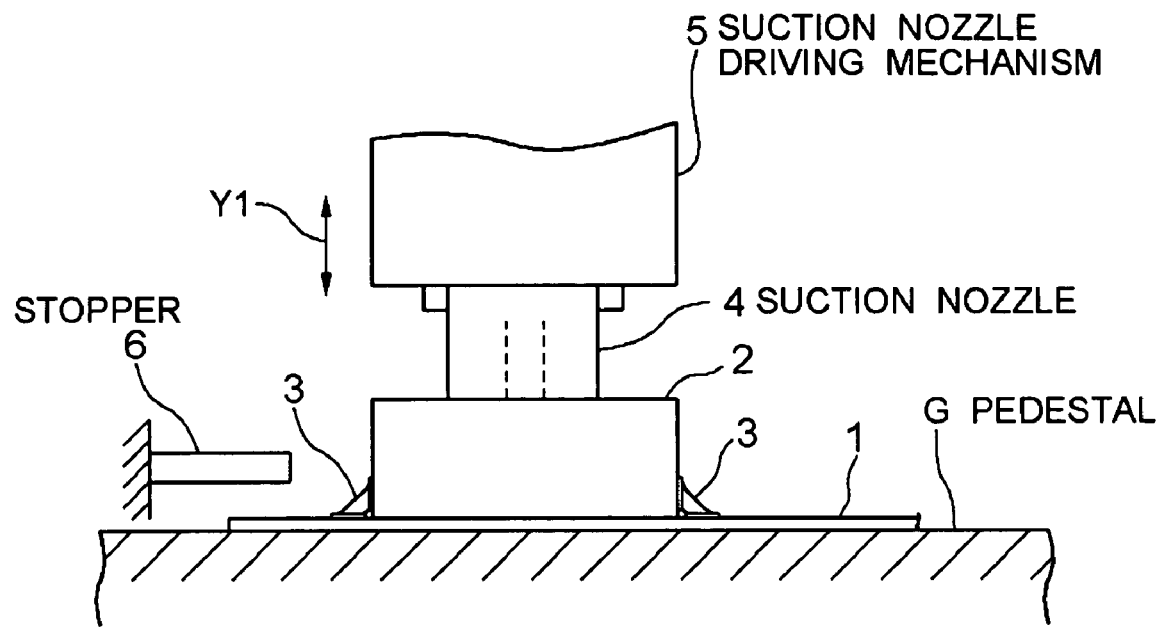
FIG. 2A and FIG. 2B show a state of a prescribed order, respectively.

First, as shown in FIG. 2A, the suspension 1 is placed on a pedestal G at a position where the removing work of the magnetic head slider 2 can be performed (step S1). Then, a suction port 41 of a suction nozzle 4 (suction device (removing device)) which functions to suction air is disposed by coming in contact with the top face (a surface opposite to a contact face with the suspension 1) of the magnetic head slider 2 (step S2). The suction nozzle 4 is fixedly mounted to a suction nozzle driving mechanism 5 which vertically moves the suction nozzle 4 as in an arrow Y1, thus constituting a suction device (removing device) together with the suction nozzle driving mechanism. Further, over the pedestal G, a plate-type stopper 6 is mounted by being placed roughly in parallel to the surface of the pedestal G at a position above the pedestal G with a distance in between, which is longer than the thickness of the suspension 1. The stopper 6 is disposed in accordance with the set position of the suspension 1 so as to be placed over the suspension 1 (step S2). Also, the placing position of the stopper 6 may be determined in advance and the placing position of the suspension 1 may be adjusted in accordance with the position of the stopper 6.

At this time, the above-described stopper 6 is disposed at the position over the gimbal spring part 11. Further, the distance from the suspension 1 placed on the pedestal G to the stopper 6 may be set, for example, to be shorter than an extent which falls within a range of elastic deformation when the suspension 1 is being deformed. With this, as will be described later, the suspension 1 moving upwards is held down by the stopper 6 thereby suppressing the deformation of the suspension 1 so as not to exceed the range of elastic deformation. The stopper 6 may be provided at the position where it always comes in contact with the suspension 1 so as to hold down the suspension 1 for not moving upwards.

Figure 2B:
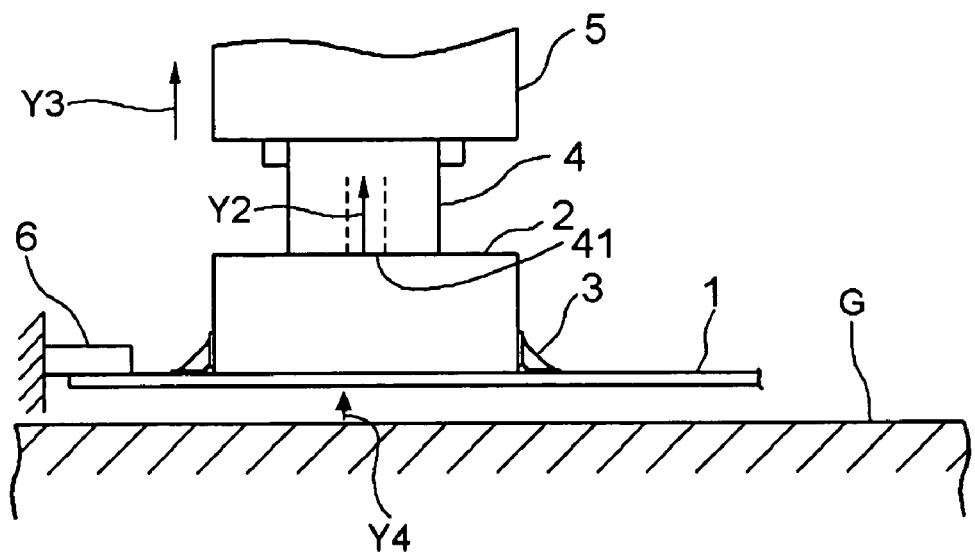

Then, suction by the suction nozzle 4 is started (step S3). Upon this, the magnetic head slider 2 is sucked to the suction port 41 of the suction nozzle 4 by a sucking force (see an arrow Y2) of the suction nozzle 4. In this state, the suction nozzle driving mechanism 5 drives the suction nozzle 4 to move upwards (see an arrow Y3). Thereby, as shown in FIG. 2B, the magnetic head slider 2 sucked by the suction nozzle 4 and the suspension joined to the magnetic head slider 2 floats from the pedestal G and sucked to move upwards (see an arrow Y4). At this time, the suspension 1 comes in contact with the stopper 6 thus being restricted from moving above the position of the stopper 6. By the sucking force of the suction nozzle 4 and the upward driving force of the suction nozzle driving mechanism 5, the magnetic head slider 2 is detached from the suspension 1, i.e. a tensile force is applied in a direction for detaching the magnetic head slider 2 from the suspension 1. The tensile force applied to the magnetic head slider 2 works on the suspension 1 to be deformed so that it is preferable to set the tensile force within the range by which the suspension is elastically deformed. That is, as described above, while the stopper 6 is provided so that the suspension 1 is not deformed by exceeding the extent of elastic deformation, the tensile force by the suction nozzle 4 is also set so as not to give excessive stress to the suspension 1. For example, as the lowermost, it is sufficient to generate the tensile force by the suction nozzle 4, which can move upwards with the magnetic head slider 2 sucked to the suction port.

Figure 3A:
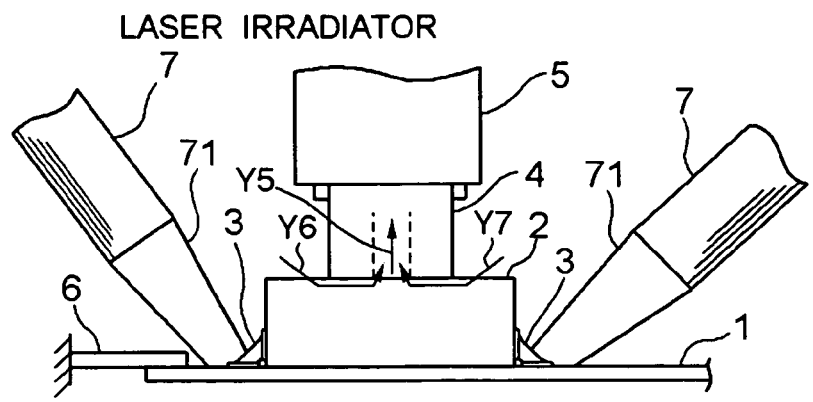
FIG. 3A shows the state of the order following the FIG. 2B.

Subsequently, as shown in FIG. 3A, laser irradiators 7 used as heating devices for heating the solder 3 are disposed by corresponding to the solder 3 at each spot. Positions of laser irradiation are set so as to locally irradiate the laser for heating the junction areas between the magnetic head slider 2 and the suspension 1 joined by the solder 3 (step S4). That is, there are six soldered spots in this embodiment. Thus, six laser irradiators 7 are prepared and a laser beam 71 is irradiated to the solder 3 at each spot. At this time, irradiation of the laser beam 71 is simultaneously started by the respective laser irradiators 7 for the solder 3 at all the spots. As the laser irradiator 7, a semiconductor laser with wavelength of about 800-900 nm is used and the laser beam 71 is irradiated to the solder 3 for about 1-5 seconds.

Figure 3B:
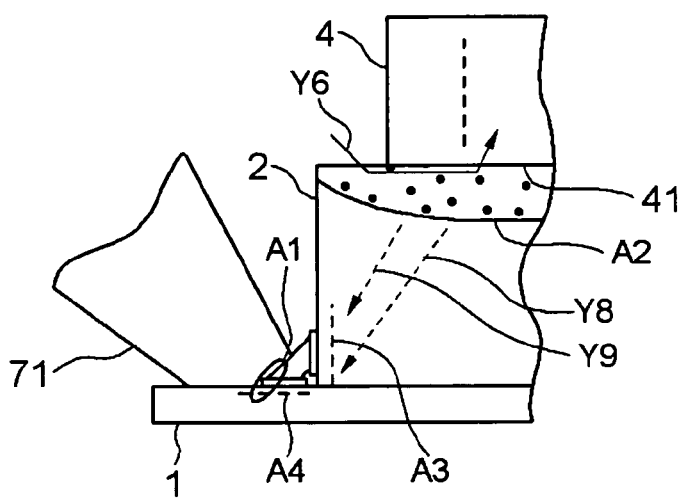
FIG. 3B shows the principle of the action thereof.
Figure 3C:
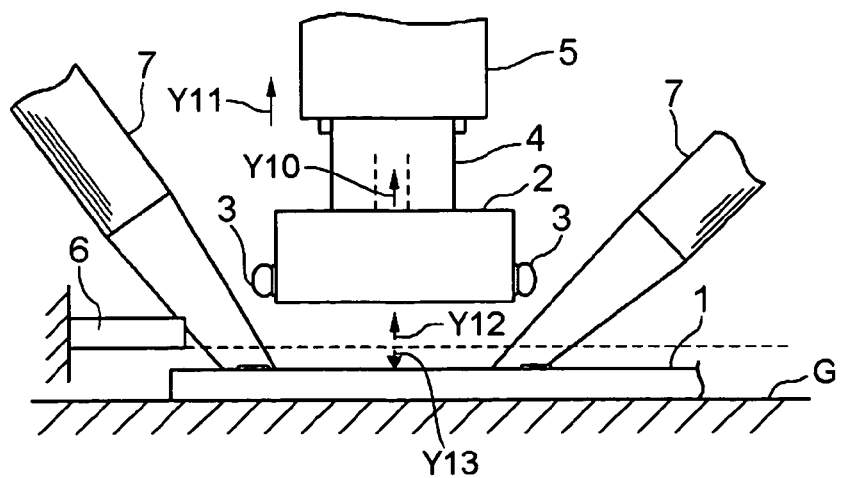
FIG. 3C shows the state of the order following FIG. 3A.

Especially, the position of the laser irradiator 7 is set so that irradiation target area of the laser beam 71 by the laser irradiator 7 becomes the boundary area between the solder 3 and the suspension 1. At this time, the suspension 1 is moved upwards by the tensile force of the suction nozzle 4. However, it is restricted by the stopper 6 so that the position setting of the irradiation area becomes easy. Also, since the laser irradiators 7 are used, the target irradiation area can be surely heated by focusing the laser beam 71 to be irradiated. FIG. 3B shows this state in an enlarged view.

In this drawing, reference numeral A1 shows the boundary area between the solder 3 and the suspension 1, which is the irradiation area of the laser beam 71. In that state, the junction area (in the vicinity of the connection pad formed on the suspension 1) between the solder 3 and the suspension 1 shown by a broken line of reference numeral A4 can be effectively heated. Thus, the solder 3 in this area (in the area of A1) is melted first. On the other hand, the heating rate becomes slow at the junction area (in the vicinity of the connection pad formed on the magnetic head slider 2) between the solder 3 and the magnetic head slider 2 shown by a broken line of numeral reference A3, which is distant from the irradiation area A1 of the laser beam 7. Therefore, the solder in this area (the area close to A3) is not to be melted before the solder 3 close to the area of A4. In addition, the magnetic head slider 2 is in a state of being sucked by the suction nozzle 4 as shown by an arrow Y5, so that there is air flown to the suction port 41 from outside. That is, there is air frown from the outside into the suction port 41 (see arrows Y6, Y7) through a gap between the top-end face of the suction nozzle 4 and the surface of the magnetic head slider 2 which is in contact with the suction port 41. Therefore, the upper part (for example, a part with dots shown by A2) of the magnetic head slider 2, which is in touch with the air flown into the suction port 41, is cooled. The heat of cooling transmits to the junction area A3 of the solder 3 as shown by arrows Y8, Y9 so that the junction area A3 is to be cooled even while being heated. Thus, the solder 3 in the part closer to the junction area A4 between with the suspension 1 becomes melted still faster. As described above, the laser beam 71 is irradiated almost simultaneously to the solder 3 at all the spots. Therefore, the entire solder 3 in each spot is melted almost simultaneously.

It is also possible that the irradiation cross sectional shape of the laser beam 71 from the laser irradiator 7 is formed as a rectangle or an ellipse, and all the solder on one end side of the magnetic head slider 2 is heated by the laser beam 71 using a single laser irradiator 7. This state will be described by referring to FIG. 4.

Figure 4A:
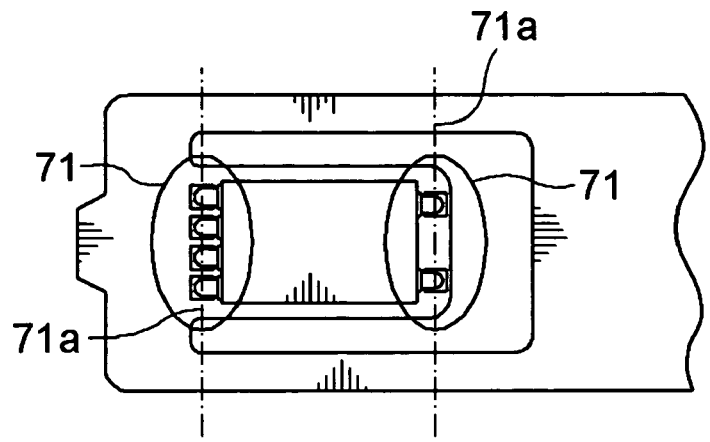
FIG. 4A, FIG. 4C are illustrations for showing an example thereof, respectively.
Figure 4B:
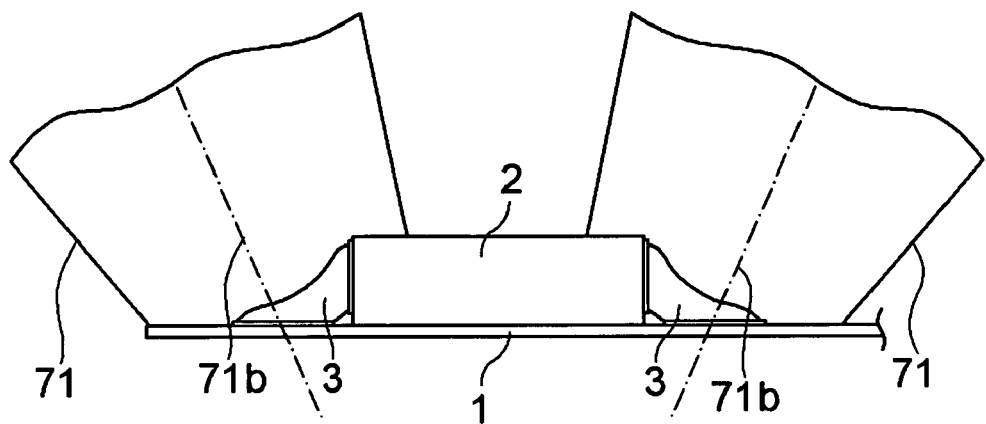
FIG. 4B is a side view of FIG. 4A.
Figure 4C:
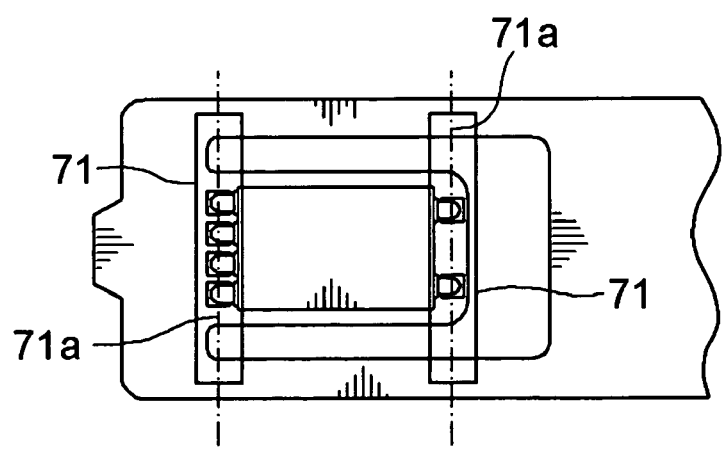
Figure 5:
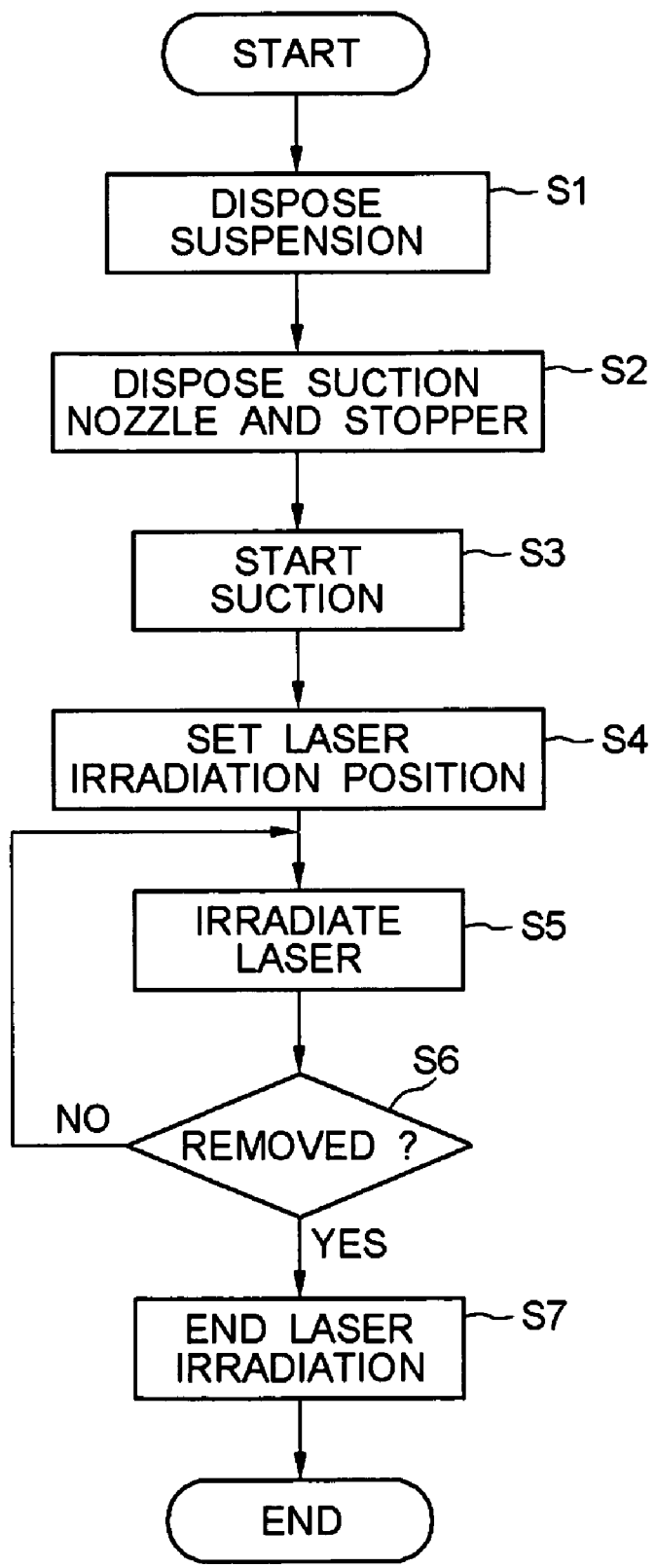
FIG. 5 is a flowchart for showing the order of the magnetic head slider removing method.

As shown in FIG. 4A, the position of irradiation in an elliptic shape is set in such a manner that the laser beam 71 irradiates onto all the solder 3 (at four spots) positioned on the end part of the top end side (on the left side of FIG. 4A) of the magnetic head slider 2. At this time, as shown in FIG. 4A, it is so set that the boundary area between the solder 3 and the suspension 1 in all the junction areas come on a center line 71a (a long axis (long diameter) of the elliptic as the irradiation cross section) of the irradiation cross sectional shape of the laser beam 71. With this, as shown in FIG. 4B which is a side view of FIG. 4A, an optical axis 71b in the irradiating direction of the laser beam 71 comes at the position of the boundary area between the solder 3 and the suspension 1. Therefore, it enables to heat the solder 3 at a plurality of spots by a single laser irradiator 7 and the target area of heating can be heated locally. As a result, it is possible to effectively heat and melt only the solder while suppressing an excessive heat for the magnetic head slider 2 and the suspension 1. For the solder 3 at the two spots in the end part which is on the opposite side (the left side of FIG. 4A-2) of the top end side of the magnetic head slider 2, another laser irradiator 7 is set so that the elliptic-shape laser beam 71 is irradiated thereto. Therefore, for the suspension 1 shown in FIG. 4A, heating and melting of the solder 3 can be performed by the two laser irradiators 7.

Further, in order to suppress heating of the magnetic head slider 2 and the suspension 1 by the laser beam 71, the irradiation cross sectional shape of the laser beam 71 is formed in a slit shape as shown in FIG. 4B by masking or using a special lens for the laser irradiator 7. Then, the center line 71a of the slit-shape laser beam 71 is aligned with the boundary area between the solder 3 and the suspension 1, which is the heating target. With this, the irradiation range of the laser beam 71 is also narrowed thus suppressing the irradiation of the laser beam onto the magnetic head slider 2 and the suspension 1. Therefore, heating of the magnetic head slider 2 and the suspension 1 can be more suppressed so that the damages thereof can be further suppressed.

When the solder 3 is melted by irradiating the laser beam 71 to the junction area in the manner as described above, as shown in FIG. 3C, bonding of the suspension 1 and the magnetic head slider 2 is released. Upon this, the magnetic head slider 2 sucked to the suction nozzle 4 (see an arrow Y10) moves upwards (see an arrow Y12) by detaching from the suspension 1 in accordance with the upward movement of the suction nozzle 4 (see an arrow Y11) which is driven by the suction nozzle driving mechanism 5. Further, the suspension 1 drops onto the pedestal G due to its own weight (see an arrow Y13), so that the magnetic head slider 2 is removed from the suspension 1 (YES in step S6). Then, laser irradiation is stopped (step S7). At this time, as described above, the solder 3 in the vicinity of the junction area A4 between with the suspension 1 is melted first and the solder 3 in the vicinity of the junction area A3 between the magnetic head slider 2 is still joined. Thus, the solder 3 is remained attached to the removed magnetic head slider 2. The solder 3 remained and attached to the suspension 1 is none or a very small amount. As a result, it becomes unnecessary to additionally perform processing for removing the solder so as to reutilize the suspension 1 from which the magnetic head slider 2 is removed. Thus, it enables to reduce the cost spent for reutilizing the suspension 1.

Furthermore, in the above-described method, the junction area is locally heated. Thus, it is possible to suppress the excessive heating of the magnetic head slider 2 or the suspension 1. Therefore, it prevents the element of the magnetic head slider 2 from being damaged by the heat. In addition, it suppresses changes in the rigidity of the suspension 1 by the heat. As a result, there is less defects in the qualities of the magnetic head slider 2 and the suspension 1 so that both are suitable for reutilization. Damages to the magnetic head slider 2 are also suppressed by the above-described cooling which is achieved due to the suction by the suction nozzle 4.

MODIFICATION EXAMPLE

A modification example of the above-described magnetic head slider removing method will be described by referring to FIG. 6. In the followings, described is an example in which the suction method by the above-described suction nozzle 4 is modified.

Figure 6A:
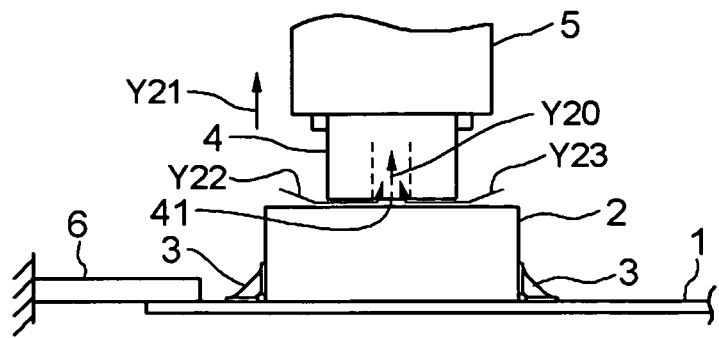
FIG. 6A, FIG. 6B are illustrations for showing an example thereof, respectively.

First, in the example shown in FIG. 6A, when sucking the magnetic head slider 2 by the suction nozzle 4, the suction port 41 of the suction nozzle 4 is disposed away from the surface of the magnetic head slider 2. By the sucking force (see an arrow Y20) of the suction nozzle 4, the magnetic head slider 2 is sucked to move upwards until the suspension 1 itself comes in contact with the stopper 6. At this time, the suction nozzle driving mechanism 5 drives the suction nozzle 4 to move up until a position (see an arrow Y21) where the suction port 41 does not come in contact with the magnetic head slider 2. That is, it is set to have such an extent of the sucking force by which the suspension 1 with the fixed magnetic head slider 2 can be sucked upwards without coming in contact with the suction nozzle 4. By setting the position of the suction port 41 in this manner at the time of suction, a large amount of air is flown into the suction port 41 (see arrows Y22, Y23) through a gap between the suction nozzle 4 and the magnetic head slider 2, thus increasing the amount of air to be in contact with the magnetic head slider 2. Accordingly, cooling of the magnetic head slider 2 can be more promoted. Therefore, it enables to further suppress melting in the vicinity of the junction area between the solder 3 and the magnetic head slider 2. Thus, the solder 3 is remained attached to the magnetic head slider 2 when the magnetic head slider 2 is removed, so that the residual on the suspension 1 can be further suppressed. Further, by promoting the cooling, breakdown of the magnetic head slider by the heat can be suppressed.

Figure 6B:
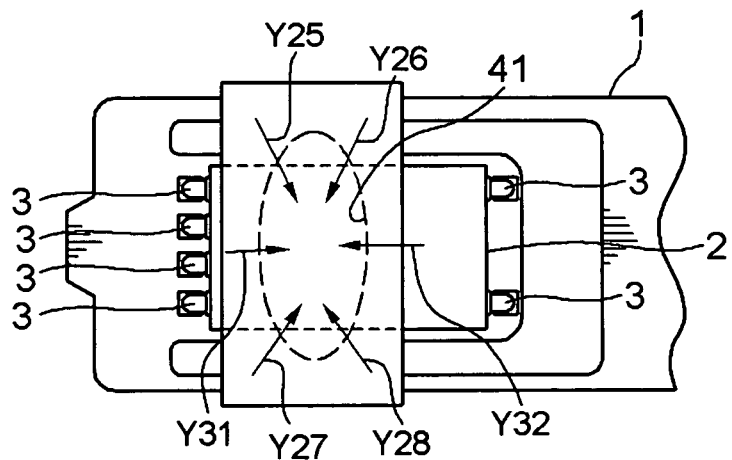
Figure 6C:
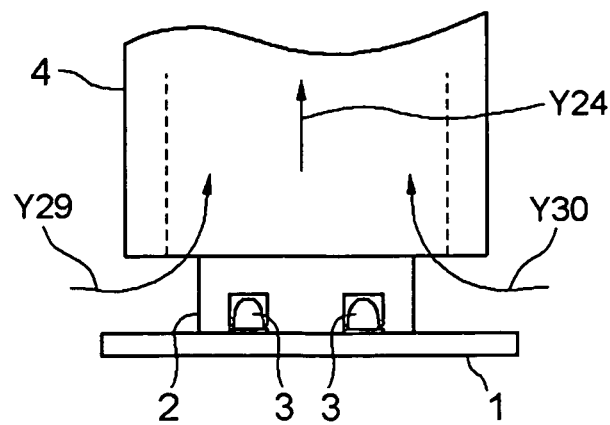
FIG. 6C is a side view of FIG. 6B.

Next, described by referring to FIGS. 6B and 6C is an example in which the suction method is modified by using another suction nozzle 4. As shown in FIG. 6B and FIG. 6C which is the side view of FIG. 6B, in this example, a part of the width (diameter) of the suction port 41 of the suction nozzle 4 is formed to be longer than the length of the magnetic head slider 2 in the width direction. By sucking the magnetic head slider 2 using this suction nozzle 4, a part of the suction port 41 is covered by coming in contact with the surface of the magnetic head slider 2. However, the other part is not covered and left in an open state. Therefore, while the magnetic head slider 2 is sucked by the suction force (see an arrow Y24) of the suction nozzle 4, a large amount of air is flown (see arrows Y25-Y28, and arrows Y29, Y30) to the suction port 41 from the open part of the suction port 41. Thereby, the amount of air to be in contact with the magnetic head slider 2 is increased. At this time, as in the above-described case, air is also flown (arrows Y31, Y32) to the suction port 41 from a gap between the magnetic head slider 2 and the suction port 41, which abut against each other, even though it is a very small amount. With this, it is also possible to achieve the same effect as that of the above-described case.

In the above-described magnetic head slider removing method, the magnetic head slider 2 is sucked by the suction nozzle 4 to apply the tensile force in a direction of detaching it from the suspension 1 before applying heat by the laser irradiator 7. However, the sucking action may be started in the middle of heating or it may be performed at a timing at which the solder 3 is melted by measuring the time of laser irradiation.

Further, although the magnetic head slider 2 is removed from the suspension 1 through sucking it by the suction nozzle 4, the tensile force may be applied by other devices or an operator. For example, there may be provided a holding mechanism, which holds the magnetic head slider 2 and pulls in a direction detaching from the suspension 1, so as to pull the magnetic head slider 2. At this time, additionally, there may be provided a cooling device for cooling the magnetic head slider 2 by abutting a low-temperature member or spraying cool air so as to cool the magnetic head slider 2 when heating the solder 3 by the laser irradiator 7. With this, as in the above-described case, it is also possible to effectively suppress melting of the junction area of the solder 3 on the magnetic head slider 2 side. Thus, the solder 3 is remained attached to the magnetic head slider 2 when the magnetic head slider 2 is removed, so that it enables to suppress the residual of the solder 3 on the suspension 1. Further, a temperature increase in the magnetic head slider 2 can be suppressed thus preventing breakdown of the magnetic head slider. The above-described cooling device is not limited to the one with the above-described structure which cools the magnetic head slider 2.

The above-described embodiment has been described by referring to the case where the laser beam 71 of the laser irradiator 7 is irradiated to the boundary area between the solder 3 and the suspension 1. However, the irradiation area is not limited to the above-described area. For example, the solder 3 can be locally irradiated exclusively. With this, overheating of the magnetic head slider 2 and the suspension 1 can be suppressed, and only the solder 3 can be heated and melted to remove the magnetic head slider 2. That is, since the laser beam 71 is not directly irradiated to the magnetic head slider 2 and the suspension 1, a fault or a change in the property after the removal can be suppressed. Thus, it enables to maintain the quality of the reuse products.

Further, in the above-described embodiment, the laser irradiator 7 is used as a heating device for melting the solder 3. However, it is not limited to that configuration. The heating device may be formed by other type of device as long as it can locally heat the solder 3 exclusively or the boundary area between the solder 3 and the suspension 1.

Second Embodiment

Figure 7A:
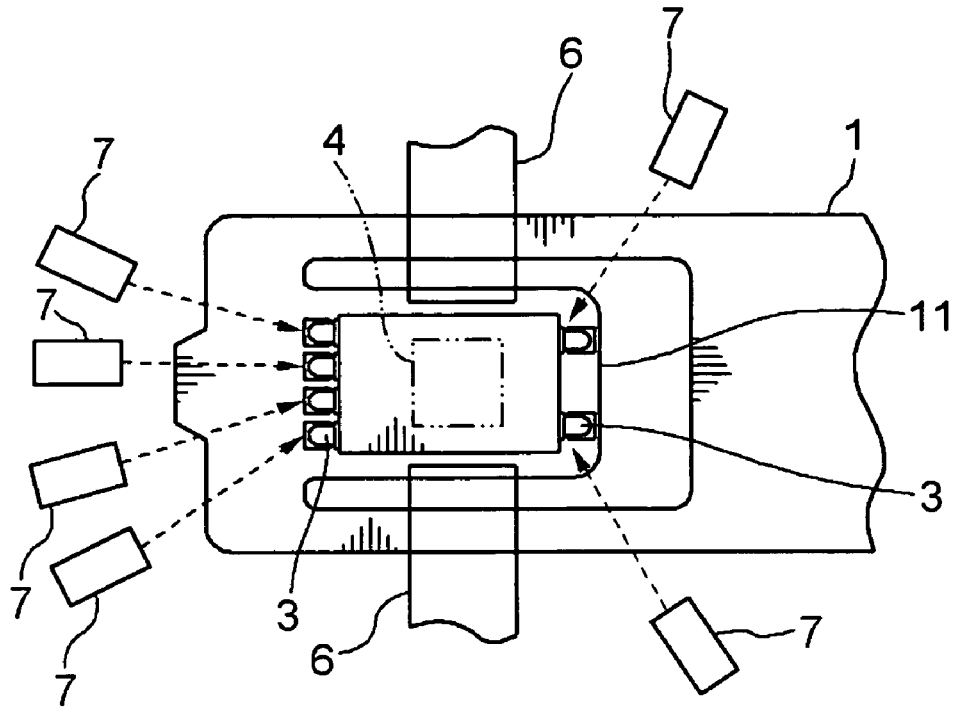
FIG. 7A is a plan view and FIG. 7B is a side view.

Next, a second embodiment of the present invention will be described by referring to FIG. 7. In the second embodiment, described is a magnetic head slider removing apparatus which achieves the magnetic head slider removing method described in the first embodiment. FIG. 7A shows a schematic diagram of the magnetic head slider removing apparatus and FIG. 7B shows a side view of FIG. 7A.

(Structure)

Figure 7B:
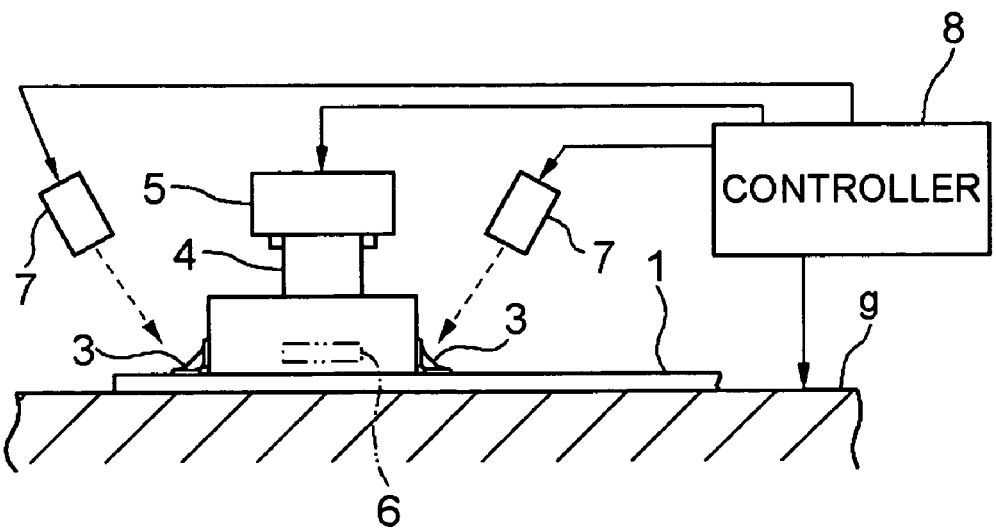

As shown in FIGS. 7A, 7B, the magnetic head slider removing apparatus comprises: a pedestal G for mounting the suspension 1 to which the magnetic had slider 2 is joined by the solder 3; laser irradiators 7 as heating devices for heating the suspension 1; a suction nozzle 4 as a removing device which removes the magnetic head slider 2 from the suspension 1 by energizing it in a direction away from the suspension 1; a stopper 6 as a movement restricting device which restricts the suspension 1 to move more than a prescribed distance in the detaching direction of the magnetic head slider 2; and a controller 8 as a controlling device which controls the action of the entire apparatus. Each structure will be described hereinafter.

First, the pedestal G is formed by a belt conveyor, for example, and conveys the suspension 1, which is judged as a defective product as a result of inspection, to a predetermined area where a removing work is carried out. For example, the placing area of the suspension 1 is marked in advance and an operator places the defective suspension 1 according to the mark. Then, it is conveyed by control of the controller 8 to the predetermined work area.

Further, in the work area on the pedestal G, there is provided a plate-type stopper 6 which projects from both sides on left and right towards the center. Thus, when the suspension 1 is conveyed, a gimbal spring part 11 of the suspension 1 comes under the stopper 6. Over the work area, there are provided a plurality of laser irradiators 7 by corresponding to the solder 3 in each spot, and the suction nozzle 4 which is driven and supported by the suction nozzle driving mechanism 5. The suction nozzle driving mechanism 5 and the suction nozzle 4 constitute a removing device which, as will be described later, energizes the magnetic head slider 2 for removing it. The structures of the laser irradiators 7 and the suction nozzle 4 are the same as those of the first embodiment, so that the detailed description will be omitted.

Furthermore, the controller 8 has a function of conveying the suspension 1 placed at the prescribed spot to the removing work area by controlling the conveying state of the belt conveyor which is the pedestal G. Further, the controller 8 has a function of controlling the irradiation action of the laser beam 71 of the laser irradiators 7 and a function of controlling the sucking action and the upward pulling action of the suction nozzle driving mechanism 5. Specifically, as described in the first embodiment, the controller 8 controls the suction nozzle driving mechanism 5 to pull the suspension 1 itself until the suspension 1 comes in contact with the stopper 6, while controlling the suction nozzle 4 to suck the magnetic head slider 2. The placing angle or the like of the laser beam 71 of the laser irradiator 7 is set in advance in such a manner that the laser beam 71 of the laser irradiator 7 is irradiated to the boundary area between the solder 3 and the suspension 1. Thus, for the suspension 1 in the above-described state, the controller 8 controls to heat the solder 3 in each spot by simultaneously starting the irradiation of all the laser irradiators 7. The laser irradiation area may be set by the operator in accordance with the placing position of the suspension 1. Furthermore, an image pickup device such as a CCD camera may be provided for specifying the boundary area between the solder 3 and the suspension 1 through applying an image processing such as template matching to the picked up image so as to set the irradiation position by automatically controlling the angle or the like of the laser irradiator 7.

(Action)

Next, the removing action of the magnetic head slider 2 by the above-described apparatus will be described. Basically, it is the same as that of the first embodiment so that it will be described briefly.

First, the operator places the defective suspension 1 along the mark on the pedestal G. Then, the placed suspension 1 is conveyed to the removing work area on the pedestal G. At this time, the gimbal spring part 11 of the suspension 1 comes under the stopper 6 and the magnetic head slider 2 comes under the suction nozzle 4.

Subsequently, the suction port of the suction nozzle 4 is brought down until coming in contact with the magnetic head slider 2 for starting the suction so that the magnetic head slider 2 is sucked by the suction nozzle 4. Then, when the suction nozzle 4 is moved upwards by the suction nozzle driving mechanism 5, the magnetic head slider 2 and the suspension 1 sucked by the suction nozzle 4 move upwards until the suspension 1 comes in contact with the stopper 6.

Then, irradiation of the laser beam 71 is performed (see broken line arrows towards the solder 3 in each spot from each laser irradiator 7) by the laser irradiator 7, in which the laser irradiation position is set in accordance with the each position of the solder 3, on the suspension 1 moved to the above-described position. At this time, heating is started simultaneously by all the laser irradiators 7 so that the solder 3 at all the spots melts almost simultaneously. Thereby, as described above, the solder 3 in the vicinity of the boundary area between with the suspension 1 becomes melted, and the magnetic head slider 2 which is sucked by the suction nozzle 4 and pulled upwards is removed from the suspension 1. At this time, most of the solder 3 is remained attached to the magnetic head slider 2. Thus, there is almost no solder 3 remained in the suspension 1 when dropped on the pedestal G.

In the above-described apparatus, as in the first embodiment described above, laser irradiation may be performed locally to the junction area of the magnetic head slider 2 and the suspension 1 joined by the solder 3. For example, the laser beam 71 may be irradiated locally to heat the solder 3 exclusively.

For pulling the magnetic head slider 2 upwards, it is not limited to the suction nozzle 4 but other devices may be used to apply the tensile force. In the case of using the suction nozzle 4, it also functions to cool the magnetic head slider by the sucking action. However, a cooling device for cooling the magnetic head slider may be additionally provided when using the other devices for suction.

Further, as described in the first embodiment by referring to FIG. 6, for the sucking action, the suction port of the suction nozzle 4 may be disposed away from the magnetic head slider 2 or may be disposed in such a manner that a part of the suction port is left open. At this time, it is preferable to form the suction port to have the larger diameter than the width of the magnetic head slider 2.

Furthermore, as shown in FIG. 7, there has been described the case of the magnetic head slider removing apparatus with the structure which comprises the same number of laser irradiators 7 as the number of the junction areas by the solder 3. However, it is not limited to that structure. As described in the first embodiment by referring to FIG. 4, it may be in a structure where the irradiation cross sectional shape of the laser beam 71 is set as an elliptic shape or the like for enabling to collectively irradiate, by a single laser irradiator 7, the solder 3 at a plurality of spots which are positioned at one end of the magnetic head slider 2, and the number of the mounted laser irradiator 7 is reduced than the number of the spots of the solder 3.

Third Embodiment

Figure 8:
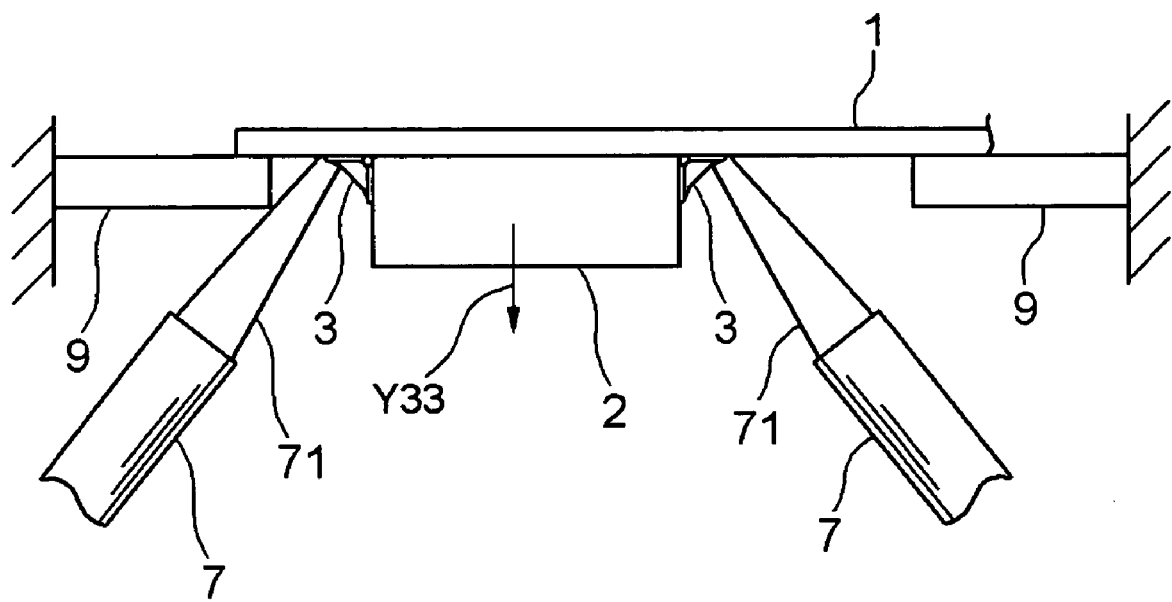
FIG. 8 is an illustration for describing another way of the magnetic head slider removing method.

Next, a third embodiment of the present invention will be described by referring to FIG. 8. FIG. 8 is an explanatory illustration showing the state of removing the magnetic head slider. This embodiment is distinctive from the above-described first and second embodiments in respect that the defective suspension 1 is inversely disposed for removing the magnetic head slider 2.

Specifically, a supporting part 9 for supporting the suspension 1 from the lower side is provided in the removing work area. Thus suspension 1 is placed on the supporting part 9 so that the magnetic head slider 2 comes thereunder. At this time, the suspension 1 is disposed in such a manner that only the suspension 1 comes in contact with the supporting part 9 and that the magnetic head slider 2 is not supported by the supporting part 9 or other members. Thereby, there is always a downward force working on the magnetic head slider 2 due to its own weight (see an arrow Y33). In other words, the magnetic head slider 2 is always energized in a direction of detaching from the suspension 1 which is supported by the supporting part 9.

In this state, the laser beam 71 is irradiated from the lower side by the laser irradiator 7 as the heating device to the solder 3 which joins the magnetic head slider 2 to the suspension 1. At this time, as described in the first and second embodiments, laser irradiation is locally applied to the boundary area between the solder 3 and the suspension 1. It may be locally irradiated to the junction area by the solder 3. For example, it may be locally irradiated to the solder 3 exclusively. Further, at this time, although not shown, it is preferable to provide a cooling device to cool the magnetic head slider 2 by spraying cool air or the like to the magnetic head slider 2 from the lower side.

By irradiating the laser in the manner as described above, the vicinity of the junction area between the solder 3 and the suspension 1 is melted and the magnetic head slider 2 drops downwards due to its own weight thus being removed from the suspension 1. At this time, like the above-described case, transmission of an excessive heat to the magnetic head slider or the suspension can be suppressed. Thus, the magnetic head slider 2 can be easily removed from the suspension 1 so that those parts can be reutilized. Particularly, the solder 3 is attached on the magnetic head slider 2 side when removed so that the solder 3 attached to the suspension 1 is decreased. Thus, it becomes easy to reutilize the suspension 1 whose cost per unit is high.

The present invention can be used as a method and an apparatus which enable to remove the magnetic head slider form the suspension by keeping the magnetic head slider or the suspension in a reusable state, when there is a defective product produced at the time of manufacturing a head gimbal assembly. With this, it enables to reduce the manufacturing cost.

What is claimed is:

1. A magnetic head slider removing method for removing a magnetic head slider from a suspension to which at least a part of the magnetic head slider is joined by solder, said method comprising:
   locally heating a junction area of said magnetic head slider and said suspension, which is joined by said solder;
   said local heating melting said solder in a vicinity of a connection pad formed on said suspension first, before melting said solder in a vicinity of a connection pad formed on said magnetic head slider;
   bonding of said suspension and said magnetic head slider is released when said solder in the vicinity of said connection pad formed on said suspension is melted, by which said magnetic head slider is removed from said suspension.

2. The magnetic head slider removing method according to claim 1, wherein said local heating is performed by using a laser irradiating device.

3. The magnetic head slider removing method according to claim 1 comprising:
   energizing said magnetic head slider towards a direction of detaching said magnetic head slider from said suspension during said heating.

4. The magnetic head slider removing method according to claim 3, wherein an energizing force for detaching said magnetic head slider away from said suspension is set within a range by which said suspension can be elastically deformed.

5. The magnetic head slider removing method according to claim 3, comprising:
holding said suspension for restricting movement of more than a prescribed distance when energizing said magnetic head slider in said direction of detaching said magnetic slider from said suspension.

6. The magnetic head slider removing method according to claim 3, wherein said energizing in said direction of detaching said magnetic slider is performed by using a suction device which suctions said magnetic head slider.

7. The magnetic head slider removing method according to claim 6, wherein, when performing said suction by said suction device, said suction device is disposed in such a manner that a part of a suction port is left open.

8. The magnetic head slider removing method according to claim 1, comprising: cooling said magnetic head slider while said heating is applied.

9. The magnetic head slider removing method according to claim 1, wherein
said local heating is simultaneously performed to all of each junction area when there are a plurality of junction areas of said solder for joining said magnetic head slider and said suspension.

* * * * *